(12) United States Patent
Miyahara

(10) Patent No.: US 10,412,249 B2
(45) Date of Patent: Sep. 10, 2019

(54) IMAGE PROCESSING APPARATUS AND CONTROL METHOD THEREFOR, AND STORAGE MEDIUM

(71) Applicant: CANON KABUSHIKI KAISHA, Tokyo (JP)

(72) Inventor: Nobuaki Miyahara, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/152,855

(22) Filed: Oct. 5, 2018

(65) Prior Publication Data
US 2019/0037093 A1    Jan. 31, 2019

Related U.S. Application Data

(63) Continuation of application No. 14/543,961, filed on Nov. 18, 2014, now Pat. No. 10,136,014.

(30) Foreign Application Priority Data

Nov. 21, 2013   (JP) .................................. 2013-241101

(51) Int. Cl.
*H04N 1/00*   (2006.01)

(52) U.S. Cl.
CPC ..... *H04N 1/00814* (2013.01); *H04N 1/00824* (2013.01); *H04N 1/00832* (2013.01)

(58) Field of Classification Search
USPC ....................................................... 358/1.15
See application file for complete search history.

(56) References Cited

U.S. PATENT DOCUMENTS

| 5,270,779 A | 12/1993 | Kawai |
| 6,289,872 B1 | 9/2001 | Dardalis |
| (Continued) | | |

FOREIGN PATENT DOCUMENTS

| JP | H1039690 A | 2/1998 |
| JP | 2001209278 A | 8/2001 |
| (Continued) | | |

OTHER PUBLICATIONS

Office Action issued in Japanese Patent Application No. 2013-241101 dated Oct. 10, 2017.

(Continued)

*Primary Examiner* — Neil R McLean
*Assistant Examiner* — Darryl V Dottin
(74) *Attorney, Agent, or Firm* — Rossi, Kimms & McDowell LLP

(57) ABSTRACT

An image processing apparatus that is capable of calculating an appropriate replacement guide value of a part even in a case where the image processing apparatus operates under different operating modes. The image processing apparatus is capable of operating in a plurality of operating modes of different image forming speeds and has a replacement guide default value showing a guide for replacement of a part for each of the operating modes. A degree of wear of the part for each of the operating modes is calculated based on the replacement guide default value. The calculated degree of wear is, in a case where the operating mode is changed, converted to a degree of wear for the operating mode after the change, and a replacement guide value of the part in the operating mode is calculated after the change based on the converted degree of wear.

18 Claims, 7 Drawing Sheets

(56) References Cited

U.S. PATENT DOCUMENTS

| | | |
|---|---|---|
| 6,625,403 B2 | 9/2003 | Carling et al. |
| 6,654,568 B2 | 11/2003 | Matsuguma |
| 8,059,974 B2 | 11/2011 | Yamaguchi |
| 2004/0085565 A1 | 5/2004 | Owen et al. |
| 2005/0141903 A1 | 6/2005 | Kwon |
| 2006/0025967 A1 | 2/2006 | Furno et al. |
| 2008/0260396 A1* | 10/2008 | Yamada .................. G03G 15/50 399/27 |
| 2009/0092402 A1 | 4/2009 | Mizuno |
| 2009/0097061 A1* | 4/2009 | Kaneko .............. H04N 1/00344 358/1.15 |
| 2011/0026067 A1 | 2/2011 | Hamaguchi |
| 2011/0093702 A1 | 4/2011 | Eom et al. |
| 2011/0129274 A1 | 6/2011 | Sunaga et al. |
| 2014/0105619 A1 | 4/2014 | Elliott et al. |
| 2015/0138583 A1* | 5/2015 | Miyahara ........... H04N 1/00814 358/1.13 |

FOREIGN PATENT DOCUMENTS

| | | |
|---|---|---|
| JP | 2002214983 A | 7/2002 |
| JP | 2003323090 A | 11/2003 |
| JP | 2003345560 A | 12/2003 |
| JP | 2004142250 A | 5/2004 |
| JP | 2004354923 A | 12/2004 |
| JP | 2005014354 A | 1/2005 |
| JP | 2006212979 A | 8/2006 |
| JP | 2008508555 A | 3/2008 |
| JP | 2008262123 A | 10/2008 |
| JP | 2009047948 A | 3/2009 |
| JP | 2009098279 A | 5/2009 |
| JP | 2009098722 A | 5/2009 |
| JP | 2009276446 A | 11/2009 |
| JP | 2010054998 A | 3/2010 |

OTHER PUBLICATIONS

Office Action issued in Japanese Appln. No. 2013-241101 dated Apr. 10, 2018.

Office Action issued in U.S. Appl. No. 14/543,961 dated May 1, 2015.

Office Action issued in U.S. Appl. No. 14/543,961 dated Nov. 24, 2015.

Office Action issued in U.S. Appl. No. 14/543,961 dated Jul. 29, 2016.

Office Action issued in U.S. Appl. No. 14/543,961 dated Feb. 21, 2017.

Office Action issued in U.S. Appl. No. 14/543,961 dated Jun. 29, 2017.

Office Action issued in U.S. Appl. No. 14/543,961 dated Feb. 16, 2018.

Notice of Allowance issued in U.S. Appl. No. 14/543,961 dated Jul. 5, 2018.

* cited by examiner

| PART | OPERATING MODE | COUNTER | DEGREE OF WEAR PER MODE | REPLACEMENT GUIDE DEFAULT VALUE | WARNING DEGREE OF WEAR |
|---|---|---|---|---|---|
| 401 | 402 | 403 | 404 | 405 | 406 |
| PART A | OPERATING MODE 1 | 00000000 | 0.00% | 00400000 | 70.00% |
| | OPERATING MODE 2 | 00120000 | 60.00% | 00200000 | 70.00% |
| PART B | OPERATING MODE 1 | 00000000 | 0.00% | 00320000 | 70.00% |
| | OPERATING MODE 2 | 00120000 | 75.00% | 00160000 | 80.00% |
| PART C | OPERATING MODE 1 | 00000000 | 0.00% | 00500000 | 70.00% |
| | OPERATING MODE 2 | 00120000 | 40.00% | 00300000 | 70.00% |
| ⋮ | ⋮ | ⋮ | ⋮ | ⋮ | ⋮ |

FIG. 5A

| PART | TOTAL COUNTER | DEGREE OF WEAR | REPLACEMENT GUIDE VALUE |
|---|---|---|---|
| PART A | 00120000 | 60.00% | 00200000 |
| PART B | 00120000 | 75.00% | 00160000 |
| PART C | 00120000 | 40.00% | 00300000 |
| ... | ... | ... | ... |

FIG. 5B

| PART | TOTAL COUNTER | DEGREE OF WEAR | REPLACEMENT GUIDE VALUE |
|---|---|---|---|
| PART A | 00120000 | 60.00% | 00200000 |
| PART B | 00120000 | 75.00% | 00200000 |
| PART C | 00120000 | 40.00% | 00420000 |
| ... | ... | ... | ... |

IMAGE PROCESSING APPARATUS AND CONTROL METHOD THEREFOR, AND STORAGE MEDIUM

BACKGROUND OF THE INVENTION

Field of the Invention

The present invention relates to an image processing apparatus and a control method therefor, and a storage medium.

Description of the Related Art

Conventionally, in an image processing apparatus, when various parts such as a fixing device or a paper feeding roller have reached the end of their life or the like, the relevant parts are replaced with new parts and operation of the image processing apparatus is continued. An image processing apparatus is known that displays a replacement guide value for each part as a guide for when to replace such parts, and display a warning message or the like so as to inform a user when a part has reached the replacement guide value.

As a measure for dealing with a case in which the replacement guide value deviates from a predicted value with respect to wear that occurs during actual operation, a function may also be considered whereby the actual degree of wear is inputted to change the replacement guide value (see Japanese Laid-Open Patent Publication (Kokai) No. 2005-14354, for example).

In addition, a management server or the like that manages parts for a plurality of image processing apparatuses is also known. It is thus possible to determine which parts need to be replaced before a service person visits the user, which reduces the frequency of visits to the user.

Further, in order to flexibly correspond to the manner in which a user uses an image processing apparatus, an image processing apparatus is available that can change, after a user operates the image processing apparatus, the engine speed or an operating mode such as an image processing mode in accordance with the needs of the user.

However, with respect to a replacement guide value for a part, in a case where a durability value of a part differs depending on the engine speed or the operating mode such as an image processing mode, different values of the replacement guide value are defined for each operating mode.

Therefore, if the operating mode is, after the image processing apparatus has been operated by a user, changed and then a replacement guide value according to the changed operating mode is displayed, there occurs a problem that, because the degree of wear of parts will differ between the operating mode before the change and the operating mode after the change, the replacement guide value will deviate from the real situation.

In a case where a replacement guide value is deviated, inputting the degree of wear by the function disclosed in Japanese Laid-Open Patent Publication (Kokai) No. 2005-14354 enables an accurate replacement guide value to be obtained; however, there occurs a problem that such setting must be performed at regular intervals for each part.

SUMMARY OF THE INVENTION

The present invention provides an image processing apparatus that is capable of calculating an appropriate replacement guide value of a part even in a case where the image processing apparatus operates under different operating modes, as well as a control method for the image processing apparatus and a storage medium.

In an aspect of the invention, there is provided an image processing apparatus that is capable of operating in a plurality of operating modes of different image forming speeds and that has a replacement guide default value showing a guide for replacement of a part for each of the operating modes, the image processing apparatus comprising: a degree of wear calculation unit configured to calculate a degree of wear of the part for each of the operating modes based on the replacement guide default value; and a guide value calculation unit configured to convert, in a case where the operating mode is changed, the degree of wear calculated by the degree of wear calculation unit to a degree of wear for the operating mode after the change, and calculate a replacement guide value of the part in the operating mode after the change based on the converted degree of wear.

According to the present invention, a degree of wear of a part is calculated for each operating mode based on a replacement guide default value, and in a case where an operating mode is changed, the calculated degree of wear is converted to a degree of wear for the operating mode in effect after the change, and a replacement guide value of the part in the operating mode after the change is calculated; accordingly, even when the image processing apparatus was operated in different operating modes, an appropriate replacement guide value of a part can be calculated.

Further features of the present invention will become apparent from the following description of exemplary embodiments with reference to the attached drawings.

BRIEF DESCRIPTION OF THE DRAWINGS

FIG. 4 is a view showing parts counter information in FIG. 3.

FIG. 5A is a view showing data for display used when displaying the parts counter information shown in FIG. 3 on an operation section, in which the relevant image processing apparatus operates in an operating mode 2 without having operated in an operating mode 1.

FIG. 5B is a view showing data for display used when displaying the parts counter information shown in FIG. 3 on the operation section, immediately after the setting of the relevant image processing apparatus was changed from the state shown in FIG. 5A to the operating mode 1.

DESCRIPTION OF THE EMBODIMENTS

An embodiment of the present invention will now be described in detail with reference to the attached drawings.

Figure 1:
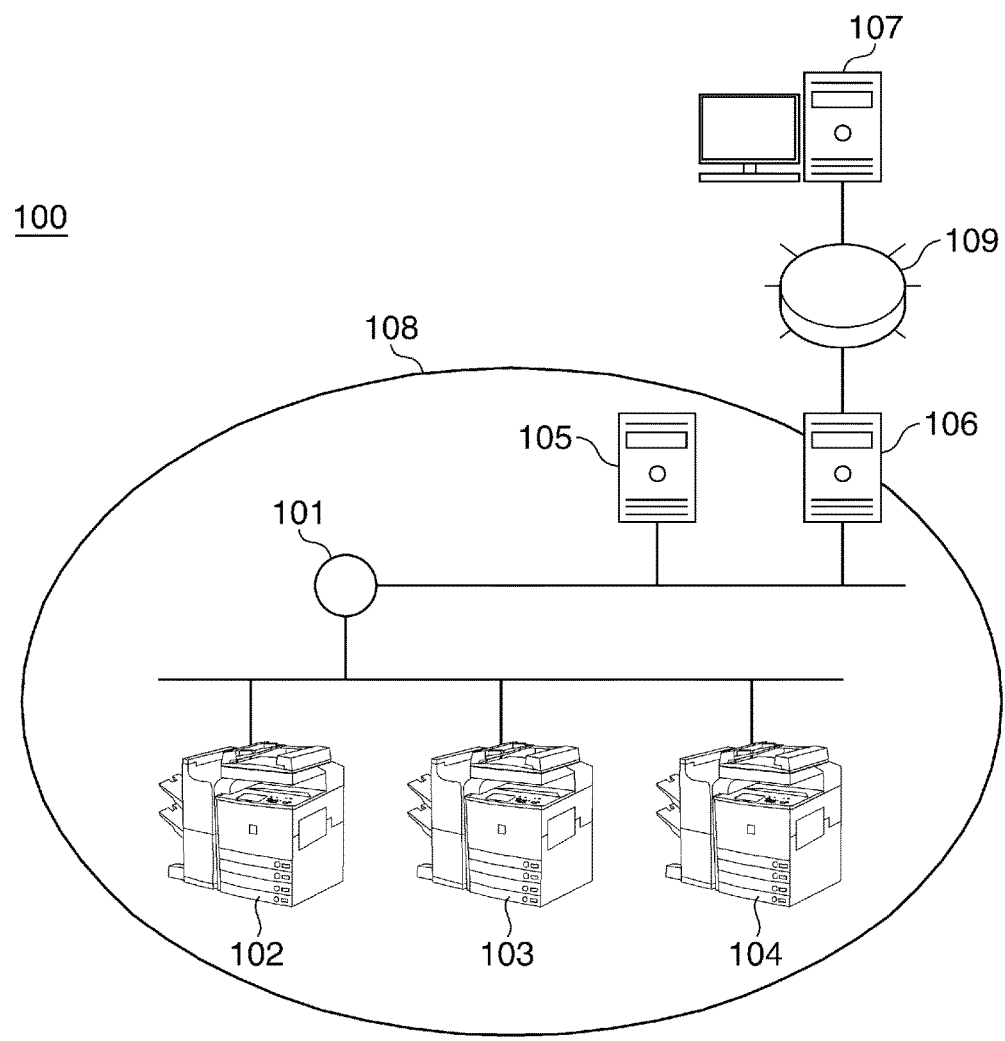
FIG. 1 is a view schematically showing a configuration of a parts management system including image processing apparatuses according to an embodiment of the present invention.

FIG. 1 is a view schematically showing a configuration of a parts management system 100 including image processing apparatuses 102, 103 and 104 according to an embodiment of the present invention.

In FIG. 1, the parts management system 100 includes image processing apparatuses 102, 103 and 104, information processing apparatuses 105 and 106, and a management server 107.

The image processing apparatuses 102, 103 and 104 and the information processing apparatuses 105 and 106 are connected to a LAN 101, and constitute a single intranet environment 108. The information processing apparatus 106 and the management server 107 are connected through the Internet 109.

The information processing apparatus 106 is equipped with a firewall function, and the information processing apparatus 105 is equipped with a proxy server function.

The management server 107 manages the operating statuses of a plurality of the image processing apparatuses 102, 103 and 104 provided within the firewall in a unified manner. Moreover, the management server 107 receives operation information of the image processing apparatuses 102, 103 and 104, such as operating mode settings, counter values and operation logs, as well as failure information of the image processing apparatuses 102 103 and 104, such as hardware failures and frequent occurrence of jams, and performs various functional processing, described later. Operating modes in the present embodiment include a plurality of operating modes in which the image forming speeds are different from one another, and the image processing apparatuses 102, 103 and 104 are capable of operating in these operating modes. The operating modes are described in detail later.

The management server 107 also performs automated order management with respect to consumables and parts of the image processing apparatuses 102, 103 and 104.

The image processing apparatuses 102, 103 and 104 process the operation information such as operating mode settings, counter values and operation logs, as well as the failure information such as hardware failures and the frequent occurrence of jams into data for communication, and transmit the data for communication to the management server 107 in accordance with a predetermined communication schedule.

The management server 107 and the image processing apparatuses 102, 103 and 104 also exchange data included, for example, in an MIB (Management Information Base) with each other according to the SNMP (Simple Network Management Protocol) standard or the like.

The management server 107 issues to the image processing apparatuses 102, 103 and 104 commands for updating their settings information, as well as commands to cause the image processing apparatuses 102, 103 and 104 to reboot, and the like.

The image processing apparatuses 102, 103 and 104 acquire commands from the management server 107 at regular intervals or in response to an instruction from the management server 107.

Therefore, the command issued by the management server 107 is retained within the management server 107 until the image processing apparatuses 102, 103 and 104 acquire the command.

To acquire the command, the image processing apparatuses 102, 103 and 104 perform HTTPS communication with the management server 107 using an SSL certificate that is retained by the respective image processing apparatuses themselves.

On this occasion, the management server 107 recognizes, when starting communication utilizing a specific SSL certificate, that the communication destination is an image processing apparatus as a management object.

Further, for example, each of the image processing apparatuses 102, 103 and 104 is provided with a monitoring apparatus. The monitoring apparatus is assigned with an ID for uniquely distinguishing the monitoring apparatus. After the HTTPS communication is established, the monitoring apparatus uses a protocol such as SOAP to transmit the ID to the management server 107, which allows the management server 107 to identify the image processing apparatus that is the communication destination.

The management server 107 then controls a specific one of image processing apparatuses 102, 103 or 104 by adding the command to a response with respect to the transmission of the ID.

It should be noted that in an actual parts management system, a plurality of intranet environments are connected to the management server.

Figure 2:
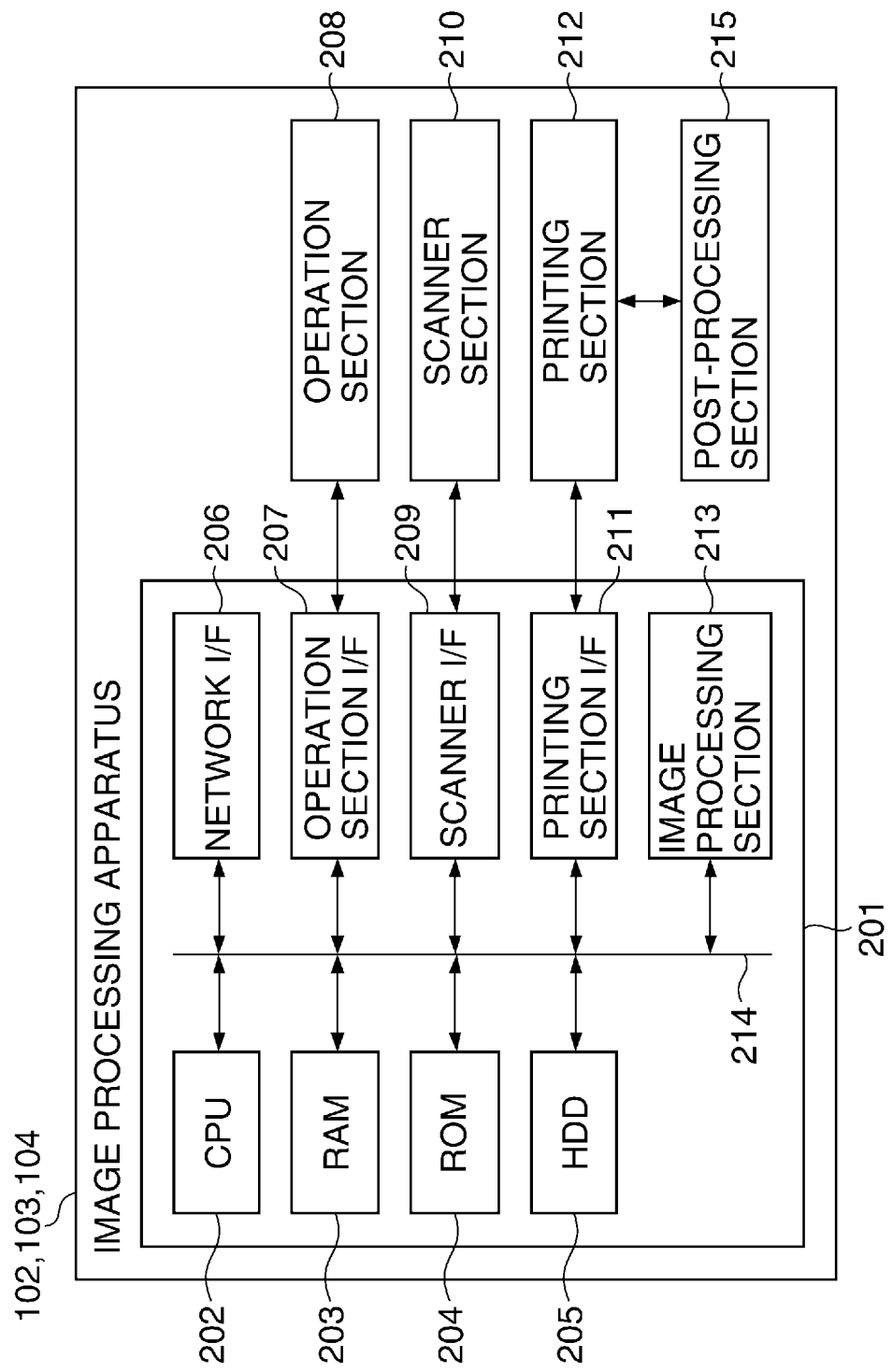
FIG. 2 is a view showing a hardware configuration of each of the image processing apparatuses shown in FIG. 1.

FIG. 2 is a view showing a hardware configuration of each of the image processing apparatuses 102, 103 and 104 shown in FIG. 1. Here, the hardware configuration of the image processing apparatus 102 will be described as a representative example, to simplify the description.

In FIG. 2, the image processing apparatus 102 includes a controller 201, an operation section 208, a scanner section 210, a printing section 212, and a post-processing section 215.

The controller 201 controls the entire image processing apparatus 102. The operation section 208 is connected to the controller 201 and includes also a display section accepting operations performed by a user, and displaying various information to the user. The scanner section 210 is connected to the controller 201, and reads an original and generates image data that shows the original.

The printing section 212 is connected to the controller 201, and forms an image that is shown by the image data on a recording medium such as a paper sheet. The image formation may be hereinafter referred to simply as "the printing". The post-processing section 215 is connected to the printing section 212, and performs post-processing such as stapling, punching or saddle stitching with respect to recording media having an image formed thereon.

The controller 201 includes a CPU 202, a RAM 203, a ROM 204, a HDD 205, a network interface 206, an operation section interface 207, a scanner interface 209, a printing section interface 211, and an image processing section 213, which are connected through a bus 214.

The CPU 202 controls the controller 201 to thereby control the entire image processing apparatus 102. The RAM 203 is used as a work area of the CPU 202, and stores various programs and various kinds of data.

The ROM 204 stores various parameters and programs that are required to execute processing in the image processing apparatus 102. The ROM 204 is a flash memory, which enables the ROM 204 to be also rewritten. A flowchart, described later, shows processing in which a program stored in the ROM 204 is expanded in the RAM 203 and executed by the CPU 202.

The HDD 205 stores various programs and various kinds of data, and is also used as a swap area of the image processing section 213. In the present embodiment, the HDD 205 stores setting values of the scanner section 210, the printing section 212, and the post-processing section 215, replacement guide values of the respective parts and counters, and the like.

The network interface 206 is an interface for connecting with the LAN 101. The operation section interface 207 is an interface between the operation section 208 and the controller 201. The scanner interface 209 is an interface between the scanner section 210 and the controller 201. The printing section interface 211 is an interface between the printing section 212 and the controller 201.

The image processing section 213 performs image processing such as rescaling, rotation, color conversion and smoothing with respect to image data generated by the scanner section 210 or print data received by the network interface 206.

Figure 3:
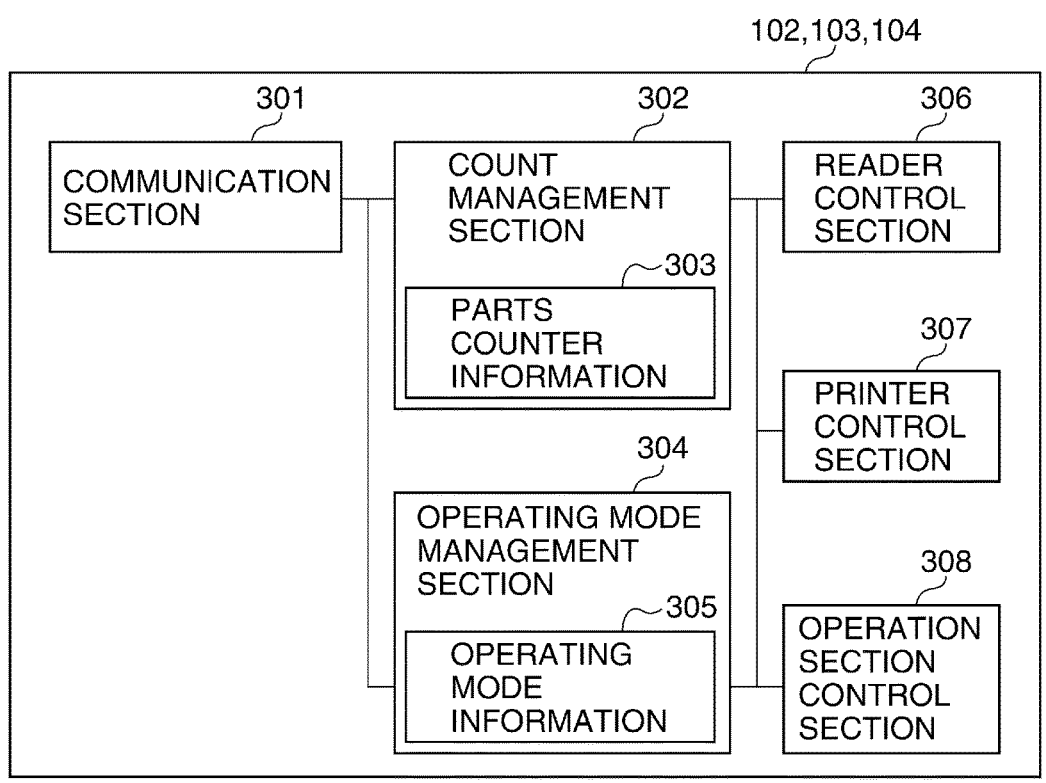
FIG. 3 is a view showing a software configuration of the image processing apparatuses shown in FIG. 1.

FIG. 3 is a view showing the software configuration of each of the image processing apparatuses 102, 103 and 104 shown in FIG. 1. Here, the software configuration of the image processing apparatus 102 will be described as a representative example, to simplify the description.

In FIG. 3, the image processing apparatus 102 includes a communication section 301, a count management section 302, an operating mode management section 304, a reader control section 306, a printer control section 307, and an operation section control section 308.

The communication section 301 communicates with the management server 107 through the network interface 206. The count management section 302 stores parts counter information 303 shown in FIG. 4, described later, on the HDD 205, and manages the parts counter information 303.

Specifically, the count management section 302 increments counters for parts managed with the parts counter information 303, in accordance with events notified from the reader control section 306 and the printer control section 307, and the like.

The operating mode management section 304 manages operating mode information 305 related to operation of the reader control section 306 and the printer control section 307. The operating mode information 305 is information that shows, for example, an engine speed, image processing parameters and a software license, or the like of the image processing apparatus 102.

Although the operating mode information 305, which is stored in the ROM 204, is not normally changed, but is changed upon installation of a software option, or the like in the image processing apparatus 102.

The reader control section 306 controls the scanner section 210, and notifies events for incrementing the parts counter information 303 to the count management section 302.

The printer control section 307 controls the printing section 212 and the post-processing section 215, and notifies events for incrementing the parts counter information 303 to the count management section 302.

The operation section control section 308 controls the operation section 208 through the operation section interface 207. Further, the operation section control section 308 accepts an input from a hard key and a touch panel of the operation section 208 to accept an operation instruction as well as an operating mode changing instruction for the image processing apparatus 102. The operation section control section 308 also displays the state of the image processing apparatus 102 as well as the parts counter information 303 and the operating mode information 305 and the like on the touch panel of the operation section 208.

FIG. 4 is a view showing the parts counter information 303 shown in FIG. 3.

In FIG. 4, the parts counter information 303 includes information for a part 401, an operating mode 402, a counter 403, a degree of wear per mode 404, a replacement guide default value 405, and a warning degree of wear 406.

It should be noted that the numerical values shown in FIG. 4 are, as one example, numerical values for a state in which the image processing apparatus 102, 103 or 104 operates in an operating mode 2 and have never operated in an operating mode 1.

The part 401 information is information for identifying a part. The operating mode 402 shows the operating mode of the image processing apparatus 102, 103 or 104 that is set in the operating mode information 305.

In the present embodiment, the operating mode 402 includes two kinds of modes, while focusing on the engine speed, that is, an operating mode 1 and an operating mode 2. The operating mode 1 is greater in engine speed than in the operating mode 2.

The counter 403 is a counter that shows the number of sheets having passed through the relevant part, and the counting unit thereof is represented by the number of sheets. In the present embodiment, the counter 403 is incremented up at the timing at which the sheet is discharged. Further, the counter 403 is incremented for each part included in the information for the part 401 and for each operating mode included in the information for the operating mode 402, and shows how many sheets having passed through each part in the specified operating mode.

The information for the degree of wear per mode 404 shows, using a proportion, how much each part was worn in the specified operating mode. The proportion indicates a proportion of the counter 403 relative to the replacement guide default value 405, and the unit thereof is represented by percent (%). The degree of wear increases in proportion to the number of sheets having passed through (the number of paper sheets (sheets of a recording medium) on which an image having been formed by the image processing apparatus 102).

Each of the replacement guide default value 405 is a previously determined value that shows a guide for replacement of the relevant part, and the unit thereof is the number of sheets having passed through, similarly to the counter 403. The respective replacement guide default values 405 are replacement guides for a case where the image processing apparatus 102, 103 and 104 operates only in the operating mode shown by the information for the operating mode 402.

In the case of the image processing apparatus 102, 103, and 104 operating in only one operating mode, the counter 403 reaching the relevant replacement guide default value 405 allows the degree of wear per mode 404 to become 100%, which means that the timing for replacement of the relevant part is reached. Therefore, according to the present embodiment, difference of the operating modes leads to difference of the replacement guide default values, showing the guides for replacement of a part.

The warning degree of wear 406 is a previously determined threshold value that shows a degree of wear at which a part replacement warning is displayed on the operation section 208, and the unit of the warning degree of wear 406 is represented by percent (%). It is necessary to display a part replacement warning on the operation section 208 at a time point at which the degree of wear of the relevant part reaches the warning degree of wear 406 when the image processing apparatus 102, 103 and 104 is operating in the relevant operating mode only.

Since there are two kinds of operating modes in the present embodiment, namely, the operating modes 1 and 2, a sum of the degree of wear per mode 404 for the operating mode 1 and the degree of wear per mode 404 for the operating mode 2 indicates the degree of wear for the relevant part.

According to the present embodiment, a configuration is adopted in which the kind of the parts counter information 303 managed by the count management section 302 is the number of sheets having passed through each part, the configuration may also be adapted to use information that is counted in various units depending on the relevant part, such as the time period for which a part was used or the length of paper sheets having passed through a part. With respect to the operating modes also, a configuration may be adapted to define operating modes based on the amount of toner placed on each sheet, or the like.

FIG. 5A is a view showing data for display used when displaying the parts counter information 303 shown in FIG. 3 on the operation section 208, in which the image processing apparatus 102, 103 and 104 operates in the operating mode 2 without having operated in the operating mode 1.

On the other hand, FIG. 5B is a view showing data for display used when displaying the parts counter information 303 shown in FIG. 3 on the operation section 208, immediately after the settings of the image processing apparatus 102, 103 and 104 has been changed from the state shown in FIG. 5A to the operating mode 1.

The information of the part 401 shown in FIG. 5A has been described above using FIG. 4. A total counter 502 shown in FIG. 5A is a counter obtained by adding together the counters 403 for the respective operating modes for each part as shown in Equation (1), and the unit of the total counter 502 is represented by the number of sheets.

$$\text{Total counter=counter (operating mode 1)+counter (operating mode 2)} \quad (1)$$

Accordingly, the total counter 502 shows the number of sheets having passed through the relevant part in all the operating modes after replacement of the relevant part.

The degree of wear 503 shows the degree of wear of each part. As shown in Equation (2), the degree of wear 503 is obtained by adding together the degrees of wear per mode 404 for each operating mode for the respective parts, and the unit thereof is represented by percent (%).

$$\text{Degree of wear=degree of wear per mode (operating mode 1)+degree of wear per mode (operating mode 2)} \quad (2)$$

As shown in Equation (3), the replacement guide value 504 is a value calculated based on the total counter 502, the degree of wear 503, and the replacement guide default value 405 of operating mode in effect after the operating mode has been changed, and the unit thereof is represented by the number of sheets.

$$\text{Replacement guide value=total counter+replacement guide default value (operating mode in effect after the operating mode has been changed)}\times(100-\text{degree of wear})\div100 \quad (3)$$

In Equation (3), the term "replacement guide default value (operating mode after change)×(100−degree of wear)÷100" is the consumed amount in the operating mode 2, and is a conversion value to the degree of wear in the operating mode 1 after the change. Further, in Equation (3), the term "100−degree of wear" shows the remaining degree of wear in the operating mode 1 after the change.

The remaining number of printing sheets is obtained by dividing the remaining degree of wear by 100 and multiplying the obtained value by the replacement guide default value (current operating mode). Further, by adding thereto the total counter that represents the number of sheets having been printed up to the current time, the number of printing sheets when the degree of wear is 100% is obtained, and this value serves as a replacement guide value of the part in the relevant operating mode.

As shown in Equation (3), the replacement guide default value is a value for the current operating mode. Accordingly, as the result of changing the operating mode, the replacement guide values 504 change from the replacement guide values 504 in FIG. 5A to the replacement guide values 504 in FIG. 5B.

For example, in the case of part A, although the replacement guide default value (operating mode 2) in Equation (3) is 200,000, as the result of changing the operating mode, the replacement guide default value (operating mode 1) in Equation (3) becomes 400,000.

When this value is substituted into Equation (3), the result is: replacement guide value=120,000 (total counter)+400,000 (replacement guide default value)×(100−60 (degree of wear))÷100=280,000 (replacement guide value 504 in FIG. 5B).

The replacement guide value 504 is a threshold value that serves as a guide for part replacement, and a service person replaces the relevant part when the total counter 502 reaches the replacement guide value 504.

Among the numerical values shown in FIG. 5B, the total counter 502 and the degree of wear 503 are calculated whenever the values are displayed. The replacement guide value 504 is stored in advance in the parts counter information 303, and is updated to the relevant new value when a new replacement guide value 504 is calculated.

Figure 6:
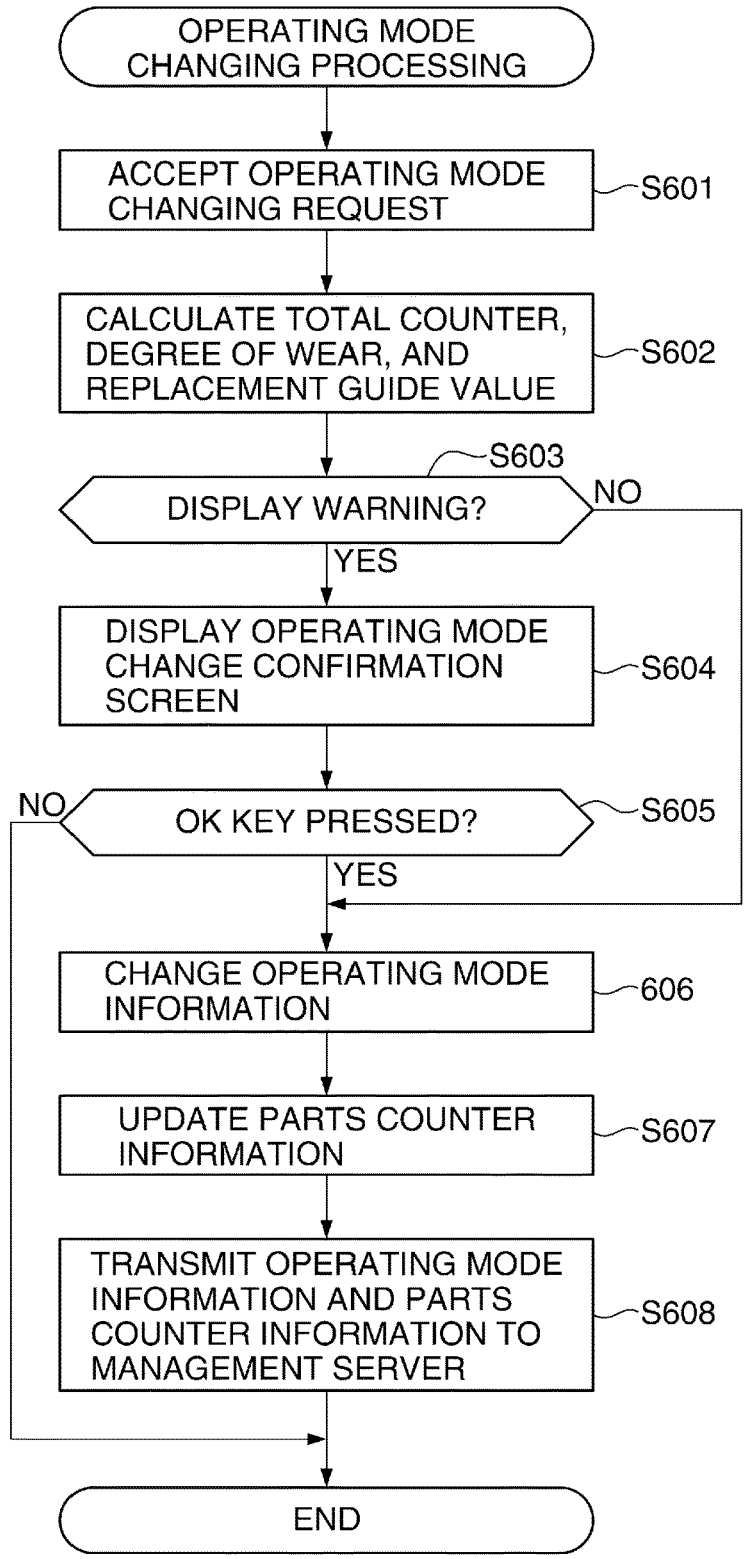
FIG. 6 is a flowchart showing the procedure of an operating mode changing processing executed by the image processing apparatuses shown in FIG. 1.

FIG. 6 is a flowchart showing the procedure of an operating mode changing processing executed by the image processing apparatuses shown in FIG. 1.

In FIG. 6, an operating mode changing request is accepted from the operation section 208 in accordance with a user operation thereon (step S601). Next, using the above described Equations 1 to 3, the relevant image processing apparatus calculates a total counter, a degree of wear, and a replacement guide value for each part in the operating mode after the change (step S602). The step S602 corresponds to "a degree of wear calculation unit" and "a guide value calculation unit".

Next, the image processing apparatus determines whether or not to display a warning on the operation section 208 (step S603). The determination in this case is performed in the following manner. First, converted degrees of wear are compared with warning degrees of wear in the operating mode after the change in a case where the operating mode is changed.

If it is found, as a result, that there is even one part for which the converted degree of wear is equal to or greater that the warning degree of wear, the image processing apparatus determines that a warning is to be displayed on the operation section 208.

As a result of the determination of the step S603, when a warning is not to be displayed (NO to the step S603), the program proceeds to step S606.

On the other hand, as a result of the determination of the step S603, when a warning is to be displayed (YES to the step S603), the image processing apparatus displays an operating mode change confirmation screen on the operation section 208.

Figure 7:
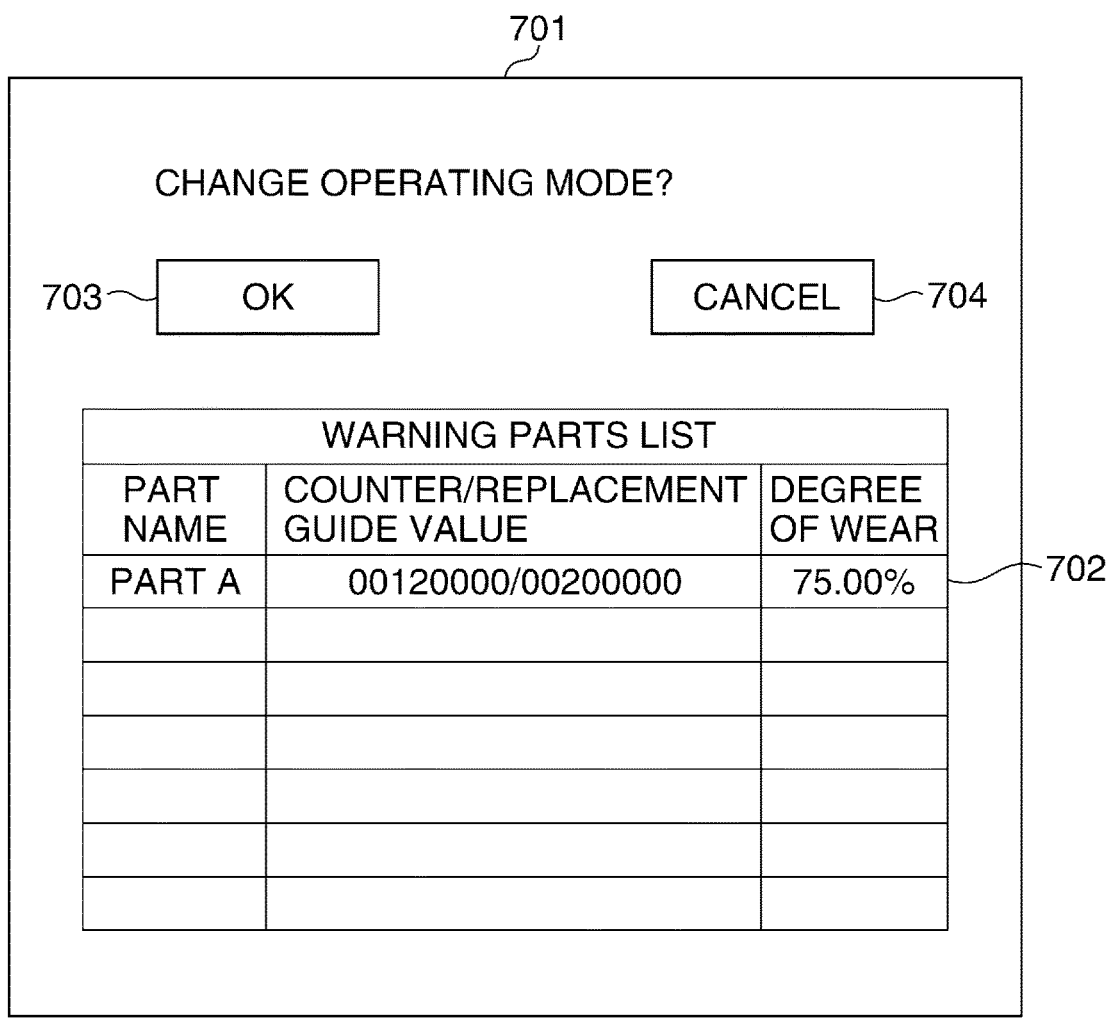
FIG. 7 is a view showing an operating mode change confirmation screen that is displayed in step S604 of FIG. 6.

FIG. 7 is a view showing an operating mode change confirmation screen 701 displayed on the operation section 208 in step S604 in FIG. 6.

In FIG. 7, the operating mode change confirmation screen 701 includes a warning parts list 702, an OK key 703 and a CANCEL key 704.

The OK key 703 is a key for executing an operating mode change. The CANCEL key 704 is a key for closing the operating mode change confirmation screen 701 without executing an operating mode change. The warning parts list 702 will be described later.

Returning to FIG. 6, the image processing apparatus determines whether or not the OK key 703 is pressed on the operating mode change confirmation screen 701 (step S605).

As a result of the determination of the step S605, when the CANCEL key 704, not the OK key 703, is pressed (NO to the step S605), the program is immediately terminated.

On the other hand, as a result of the determination of the step S605, when the OK key 703 is pressed (YES to the step S605), the operating mode management section 304 changes the operating mode information 305 stored in the ROM 204 (step S606).

Next, the parts counter information 303 is updated with the replacement guide value calculated in the step S602 (step S607).

The operating mode information 305 changed in the step S606 and the parts counter information 303 updated in the step S607 are then transmitted to the management server 107 (step S608), followed by the program being terminated.

Thus, the present embodiment is so constructed that, in a case where the operating mode is changed, the changed operating mode, a counter as the number of printed sheets for each operating mode included in the parts counter information 303, a degree of wear per mode as a degree of wear, a replacement guide default value, and a warning degree of wear are transmitted to the management server 107 that manages the image processing apparatuses 102, 103 and 104.

Although the above described operating mode changing processing is started by an operating mode changing request made by a user, a configuration may also be adapted to start the operating mode changing processing upon the occurrence of various events such as, for example, when it is detected that a part is changed with the operating mode changed at startup.

The warning parts list 702 shown in the aforementioned FIG. 7 will now be described.

The warning parts list 702 shown in FIG. 7 is a list of parts for which the degree of wear became equal to or greater than the warning degree of wear 406 when the operating mode was changed. A part name, a counter/replacement guide value, and a degree of wear are displayed in the warning parts list 702. It should be noted that the "counter" in the "counter/replacement guide value" item is the total counter.

In the case shown in FIG. 7, the degree of wear of the part A in the case that the operating mode is changed is 75.00%, and since this is greater than or equal to the warning degree of wear 406 that is 70.00% in the operating mode 1, the part A is listed in the warning parts list 702. Thus, according to the present embodiment, a warning is displayed on the display section when a converted degree of wear is greater than or equal to a predetermined warning degree of wear.

As described above, according to the present embodiment, the degree of wear of a part is calculated for each operating mode based on a replacement guide default value, and if the operating mode is changed, the calculated degree of wear is converted to a degree of wear in the operating mode after the change, and a replacement guide value of the part in the operating mode after the change is calculated (step S602); accordingly, even when the image forming apparatus operates in different operating modes, appropriate replacement guide values of parts can be calculated.

Further, the operating mode information 305 including the image forming speed after the change, and the parts counter information 303 updated in the step S607 are transmitted to the management server 107, the image processing apparatus can be provided in which the management server 107 also can manage appropriate replacement guide values.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blue-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-241101, filed Nov. 21, 2013 which is hereby incorporated by reference herein in its entirety.

What is claimed is:

1. An image forming system comprising:
a printer device, having a predetermined part, configured to execute one or more image forming processes of forming an image on a sheet, the printer device being operable in a plurality of operating modes including a first operating mode in which a first number of the image forming processes can be executed within a predetermined time period and a second operating mode in which a second number of the image forming processes can be executed within the predetermined time period;
a storage configured to store information related to a frequency of the printer device, having the predetermined part, executing the image forming processes in the first operating mode; and
at least one controller configured to function as:
an output unit configured to output a first value as a value showing a replacement timing of the predetermined part in a case where the information is stored in the storage and the first operating mode is set as one of the operating modes of the printer device, and to output a second value as a value showing a replacement timing of the predetermined part in a case where the information is stored in the storage and the second operating mode is set as one of the operating modes of the printer device.

2. The image forming system according to claim 1, wherein each of the first value and the second value is information to be displayed on a screen.

3. The image forming system according to claim 2, wherein a number of printing sheets per unit time of the printer device is greater when the printer device is set to operate in the second operating mode than when the printer device is set to operate in the first operating mode, and
wherein the first value is less than the second value.

4. The image forming system according to claim 2, further comprising a display configured to display the screen.

5. The image forming system according to claim 1, wherein the output unit is configured to output the second value in response to the operating mode of the printer device being changed from the first operating mode to the second operating mode.

6. The image forming system according to claim 1, wherein each of the first value and the second value is a value related to the frequency of the printer device executing the image forming processes.

7. The image forming system according to claim 1, wherein the frequency of the printer device executing the image forming processes is a value corresponding to the number of sheets having an image formed thereon.

8. The image forming system according to claim 1, wherein the printer device and the at least one controller are disposed in an image forming apparatus, and the first value and the second value are transmitted from the image forming apparatus to a server.

9. The image forming system according to claim 1, wherein the printer device has another part, and the storage stores information related to another frequency of the printer device, having the another part, executing the image forming processes in the first operating mode.

10. An image forming system comprising:
a printer device, having a predetermined part, configured to execute one or more image forming processes of forming an image on a sheet, the printer device being operable in a plurality of operating modes including a first operating mode in which a first number of the image forming processes can be executed within a predetermined time period and a second operating mode in which a second number of the image forming processes can be executed within the predetermined time period;
a storage configured to store a first information related to a frequency of the printer device, having the predetermined part, executing the image forming processes in the first operating mode, and a second information related to another frequency of the printer device, having the predetermined part, executing the image forming processes in the second operating mode; and
at least one controller configured to function as:
an output unit configured to output a value showing a degree of wear for the predetermined part based on at least the first information and the second information,
wherein the degree of wear per frequency of the printer device executing the image forming processes differs between a case where the printer device operates in the first operating mode and a case where the printer device operates in the second operating mode.

11. The image forming system according to claim 10, wherein the value showing the degree of wear is information to be displayed on a screen.

12. The image forming system according to claim 11, further comprising a display configured to display the screen.

13. The image forming system according to claim 10, wherein the degree of wear is shown using a proportion.

14. The image forming system according to claim 10, wherein the frequency of the printer device executing the image forming processes is a value corresponding to a number of sheets having an image formed thereon.

15. The image forming system according to claim 10, wherein the printer device and the at least one controller are disposed in an image forming apparatus, and the degree of wear is transmitted from the image forming apparatus to a server.

16. The image forming system according to claim 10, wherein the printer device includes another part, and the storage stores information related to a third frequency of the printer device, having the another part, executing the image forming processes in the first operating mode.

17. A method of controlling an image forming system including a printer device, having a predetermined part, configured to execute one or more image forming processes of forming an image on a sheet, the printer device being operable in a plurality of operating modes including a first operating mode in which a first number of the image forming processes can be executed within a predetermined time period and a second operating mode in which a second number of the image forming processes can be executed within the predetermined time period, and a storage configured to store information related to a frequency of the printer device, having the predetermined part, executing the image forming processes in the first operating mode, the method comprising:
outputting a first value as a value showing a replacement timing of the predetermined part in a case where the information is stored in the storage and the first operating mode is set as one of the operating modes of the printer device; and
outputting a second value as a value showing a replacement timing of the predetermined part in a case where the information is stored in the storage and the second operating mode is set as one of the operating modes of the printer device.

18. A method of controlling an image forming system including a printer device, having a predetermined part, configured to execute one or more image forming processes of forming an image on a sheet, the printer device being operable in a plurality of operating modes including a first operating mode in which a first number of the image forming processes can be executed within a predetermined time period and a second operating mode in which a second number of the image forming processes can be executed within the predetermined time period, and a storage configured to store a first information related to a frequency of the printer device, having the predetermined part, executing the image forming processes in the first operating mode, and a second information related to another frequency of the printer device, having the predetermined part, executing the image forming processes in the second operating mode, the method comprising:
acquiring the first information and the second information stored in the storage; and
outputting a value showing a degree of wear for the predetermined part based on at least the first information and the second information,
wherein the degree of wear per frequency of the printer device executing the image forming processes differs between a case where the printer device operates in the first operating mode and a case where the printer device operates in the second operating mode.

* * * * *